United States Patent [19]
Mason et al.

[11] Patent Number: 5,919,015
[45] Date of Patent: Jul. 6, 1999

[54] MECHANICAL DRIVE FOR A BLIND SPLINE BROACHING MACHINE

[75] Inventors: Arthur C. Mason, Harrison Township; Robert E. Roseliep, Grosse Pointe, both of Mich.

[73] Assignee: Utica Enterprises, Inc., Shelby Township, Mich.

[21] Appl. No.: 08/842,750

[22] Filed: Apr. 16, 1997

[51] Int. Cl.[6] .................................................. B23D 37/00
[52] U.S. Cl. ......................... 409/244; 72/454; 74/89.15; 409/255; 409/285
[58] Field of Search ................................. 74/89.15, 110; 409/244, 254, 255, 281, 285; 72/450, 454

[56] References Cited

U.S. PATENT DOCUMENTS

| | | |
|---|---|---|
| 839,351 | 12/1906 | White . |
| 1,437,856 | 12/1922 | Myers . |
| 2,711,674 | 6/1955 | Abbott, Jr. . |
| 3,372,620 | 3/1968 | Stuemer ................................. 409/254 |
| 3,623,389 | 11/1971 | Krynytzky et al. . |
| 3,795,168 | 3/1974 | Spachner et al. . |
| 3,817,139 | 6/1974 | Desai et al. . |
| 4,027,574 | 6/1977 | Russell ........................................ 409/7 |
| 4,537,538 | 8/1985 | Mitamura et al. ...................... 409/217 |
| 4,565,104 | 1/1986 | Akin ....................................... 74/89.15 |
| 4,802,374 | 2/1989 | Hamelin et al. ........................ 74/89.15 |
| 4,959,989 | 10/1990 | Obrecht et al. ............................ 72/454 |
| 4,966,509 | 10/1990 | Engelhardt et al. .................... 409/281 |
| 5,315,750 | 5/1994 | Roseliep .................................... 29/563 |

*Primary Examiner*—Andrea L. Pitts
*Assistant Examiner*—Christopher Kirkman
*Attorney, Agent, or Firm*—Vanophem Meehan & Vanophem, P.C.

[57] ABSTRACT

A mechanical drive linkage for a blind spline broaching machine wherein a rotary motion provided by a servo driven helical ball or roller screw is converted to a linear reciprocal motion of a ram through the use of a kite link and a pivot link that as a part of their motion communicate with guide tracks in order to prevent side loads from being applied to the ball screw, its carriage, or the ram of the blind spline broaching machine.

5 Claims, 4 Drawing Sheets

MECHANICAL DRIVE FOR A BLIND SPLINE BROACHING MACHINE

BACKGROUND OF THE INVENTION

1. Field of the Invention

The present invention generally relates to broaching machinery, such as the type used to progressively broach blind splines on a workpiece. More specifically, the invention relates to a drive mechanism for converting a rotary movement into a reciprocating rectilinear movement of variable amplitude for driving the ram of a blind spline broaching machine. It will be appreciated, however, that the drive mechanism is capable of broader applications and could be used for many other type of machines.

2. Description of the Prior Art

Figure 1:
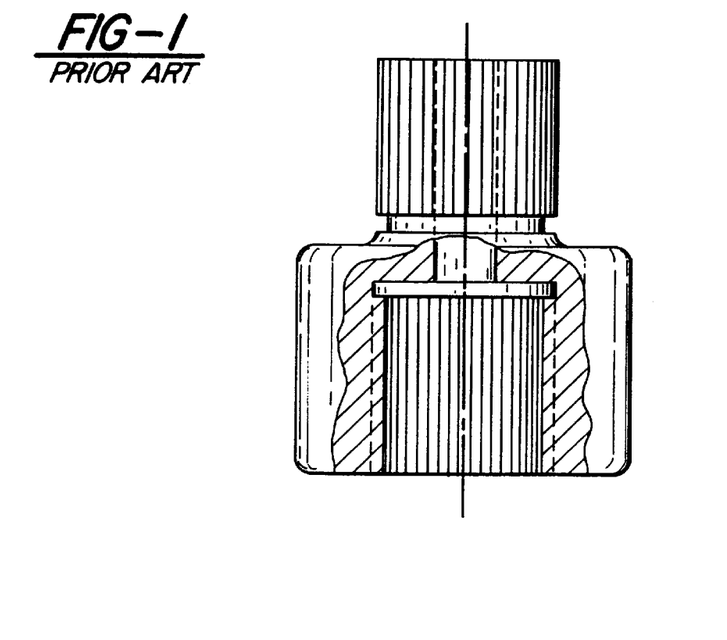
FIG. 1 is a partial cross-sectional view illustrating one type of prior art workpiece on which either internal splines or external splines may be formed which necessitates the use of a blind spline broaching machine.

The broaching of external or internal splines has been practiced with considerable success with long pull broaches which are pulled entirely through the blank in order to complete the spline in a single pass. However, in some cases, workpiece configurations are such that they do not lend themselves to situations where broaches can be pulled entirely through the blank as is the case of an internal spline on a workpiece with directed webs for flanges which will not permit the passage of the broaching tool, see FIG. 1. Also, with respect to an external spline on the end of a shaft, it is not feasible to use a pull broach and, accordingly, such operations must be accomplished by machining, hobbing, or shaping to complete an external spline on the end of a shaft. Accordingly, "blind spline" broaching machines are used in the machining of splines on a workpiece such as the end of a shaft, where the part configuration is such that a pull broach cannot be passed completely over or through the part. Blind spline broaching machines are also suitable for forming other precision features, such as sprockets, keyways, gears, cams and contours. This type of broaching is particularly advantageous in the manufacture of precision parts in terms of machine time, which can be more than ten times faster than the conventional operations of hobbing or shaping.

Conventionally, blind spline broaching consists of the movement of a workpiece through a series of tools which progressively remove material until the desired final dimensions are achieved. Typically, a workpiece is mounted to an indexing table which indexes the workpiece to each of a number of tools held in hydraulic rams. When its respective ram is actuated, a tool performs work on a workpiece, removing a specified amount of metal from the workpiece. The table is then indexed to align the workpiece with the next tool, and the cycle is repeated until the workpiece has encountered each tool and has been brought to its final size and shape. Alternatively, it is known to locate the tools on the indexing table while mounting the workpieces on the hydraulic rams. An advantage here is that the number of hydraulic rams required is independent of the number of broaching operations desired. For instance, six broaching tools can be located on the indexing table while two rams, each holding a workpiece, can be actuated to broach the workpiece using two of the six tools. The table can then be indexed to align the next two tools with the workpieces until each workpiece is finished. The finished workpieces are then removed from the blind spline broaching machine in a preferably automated manner. By definition, blind spline broaching machines require careful control of the stroke of the ram in order to avoid interfering with the remainder of the workpiece. Accordingly, the end of travel for the ram generally occurs within a groove placed on the shaft or internal bore so that the tooth form of the spline can be completed yet the ram may be timely stopped and retracted without interfering with the remainder of the workpiece.

Figure 2:
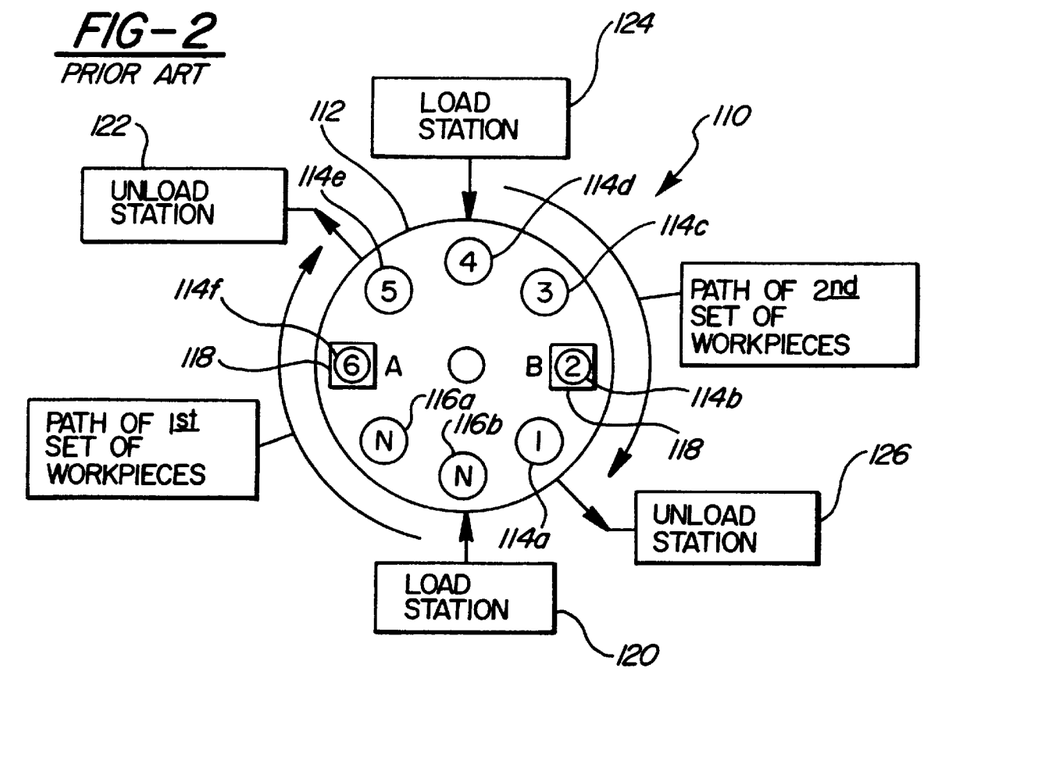
FIG. 2 is a schematic overhead view of a blind spline broaching machine known in the prior art.

Because efficiency is increased when more than one workpiece is being broached at any given time, it is generally preferable to have more than one ram. However, to maintain the size and complexity of a blind spline broaching machine, it is also preferable to limit the number of rams. An illustrated example of this aspect is illustrated by the prior art blind spline broaching machine shown in FIG. 2. FIG. 2 is an overhead view of an indexing table 112 of a blind spline broaching machine 110. The indexing table 112 has six tool stations at 114 (stations 114a–114f) located along its periphery, along with two receptacles, referred to as "nests", 116a and 116b for loading and unloading workpieces from the indexing table 112. Two hydraulic rams 118 are located above the indexing table 112 as indicated. The hydraulic rams 118 are diametrically opposed each other, and define two separate paths which workpieces can take through the blind spline broaching machine 110. For example, workpieces can pass through the blind spline broaching machine 110 by entering at a first loading station 120 and exiting at the first unloading station 122. Correspondingly, a second loading station 124 is located diametrically opposite the first loading station 120, at which other workpieces can enter the blind spline broaching machine 110. The second group of workpieces will exit the blind spline broaching machine 110 at a second unloading station 126, which is diametrically opposite the first unloading station 122. During a machining cycle, workpieces are loaded into the second nest 116b each time the second nest 116b is indexed to one of the load stations 120 and 124. Concurrently, a workpiece is held by each hydraulic ram 118 and with each movement of the indexing table 112, the workpieces will be driven downwards to encounter one of the tools 114 on the indexing table 112. Once a workpiece has been broached in the last operation by the last tool 114f, the indexing table 112 is again indexed to permit the workpiece to be dropped into the first nest 116a. The subsequent indexing of the indexing table 112 will carry the machined workpiece toward one of the unload stations 122 or 126 while bringing the new workpiece into alignment with the hydraulic ram 118. The new workpiece will then be automatically secured to the hydraulic ram 118 and, with the next movement of the indexing table 112, will be machined by the successive tools 114a–114f, starting with the tool station 114a and continuing through completion at the tool station 114f.

The above described indexing system has significantly reduced the congestion surrounding a prior art broaching machine and the associated loading/unloading activity. The improved indexing table has a single loading/unloading station at which workpieces are alternately loaded into and unloaded from a platform. Because the workpieces are loaded and unloaded from the same position along the periphery of the blind spline broaching machine indexing table, the side of the blind spline broaching machine opposite the loading/unloading station remains open to permit ready access to the tooling and the interior structure of the blind spline broaching machine if such access is necessary. The improved loading/unloading station is described in detail in U.S. Pat. No. 5,315,750 assigned to the common assignee hereof and is herein incorporated by reference.

The use of hydraulic rams associated with the processing of workpieces in a blind spline broaching machine has been accomplished with some success in the prior art. Typically, the hydraulic ram consists of a piston-cylinder combination extending above the frame of the machine. The piston rods are connected to ram slides in combination with re-circulating pre-loaded ball type guides in order to power the slides to regulate their stroke. The tool ram slide and the work holder station on the indexing table are arranged to register upon proper indexing of the table so that different tool collars can each perform a spline cut on a workpiece as the slides are moved vertically down over the retained workpieces. In the prior art, the tool slides may be operated individually, sequentially or simultaneously. Sequential operation requires less hydraulic pump capacity and is more economical than if all the hydraulic rams are operated simultaneously. The operation of the hydraulic ram requires a hydraulic circuit wherein a pump delivers pressure fluid from a tank to a valve having an operating lever which can be manually or solenoid operated. The pressure line delivers fluid to the respective cylinders when the valve is actuated to force the rams down and cause the spline tools to perform respective cuts on a workpiece. Shifting a lever to an opposite direction will direct pressure to a return line in order to raise the rams to permit indexing of the table. Accordingly, the use of hydraulic rams to power a blind spline broaching machine requires extensive hydraulic circuitry as well as separate hydraulic containers to ensure the integrity of the fluid level in the system including numerous valves, all subject to leakage or malfunction. Such hydraulic equipment consumes a great deal of energy and generates excessive heat in the environment which must be removed through air conditioning to provide a comfortable workplace and, in effect, results in a very inefficient operation with respect to the overall efficiency of the operation of a blind spline broaching machine. Further, leakage of hydraulic fluid becomes an environmental problem and any spills must be properly cleaned. A continuous supply of hydraulic fluid must be provided to prevent the broaching machine from malfunctioning due to insufficient hydraulic fluid within the system that controls the operation of the hydraulic rams. These shortcomings and others are well known. To avoid these problems, what is needed is a faster, more reliable mechanical drive for a blind spline broaching machine which overcomes the disadvantages associated with the use of hydraulic rams in powering a blind spline broaching machine.

Numerous mechanical drive systems are known to exist in the prior art to provide straight-line motion for a tool such as a broach yet utilize rotary as well as reciprocating input for the primary motive power. For example, a two bar toggling mechanism such as that disclosed in U.S. Pat. No. 3,623,389 is a common design element to obtain reciprocating linear motion such as is dictated by the operation of a blind spline broaching machine. The ram is slidably guided by the frame for vertical movement and at one end is attached to a toggle link which is pivotally supported at its upper end to the frame of the machine. A central pin of the toggle link is secured to a piston rod of a hydraulic fluid actuator. The hydraulic actuator through its attachment through the toggle link provides reciprocating linear motion to toggle the link from a maximum to a minimum position providing linear reciprocating motion for the ram of the machine.

A further example of a rotary-to-reciprocating movement is taught by Desai et al., U.S. Pat. No. 3,817,139, which discloses a drive arrangement, including a linkage system having a first link pivotally connected between the press slide, and a second link that is connected to a driven crank. A third link is pivotally connected between the press frame and the second link. The several links are arranged to provide desirable kinematic and dynamic characteristics for a shearing press by developing a selected coupler curve at the pivot point between the first and second links, which coupler curve defines the movement of the slide, and accordingly the shearing blade, through the stroke of the slide. In the operation of a mechanical drive linkage system both of these prior art devices generate significant side loads, since the linkage system operates at an angle relative to the linear movement of the ram. When viewed in the context of the requirements of a blind spline broaching machine, which may require as high as forty tons of force to complete a cycle, both these prior art devices are completely inappropriate for such application. Accordingly, what is needed is a mechanical drive mechanism that overcomes the shortcomings of hydraulic drive mechanisms as well as that eliminates side loads, with a minimum deflection, on the drive linkage itself by distributing the loads into the machine structure of a blind spline broaching machine rather than the drive elements themselves.

SUMMARY OF INVENTION

According to the present invention there is provided a mechanical drive linkage for a blind spline broaching machine for machining splines as well as sprockets, keyways, gears, cams and contours on a workpiece, such as a shaft. The blind spline broaching machine incorporates a single loading/unloading station at which workpieces are alternatively loaded onto and unloaded from a platform as clearly taught by U.S. Pat. No. 5,315,750 incorporated herein by reference.

The mechanical drive linkage for the blind spline broaching machine of this invention includes a servo driven helical ball screw or roll screw mounted in a housing that carries a carriage or ball nut to translate in a linear reciprocating motion along the ball screw. The ball screw is driven by a servo motor. The carriage or ball nut has along its sides a pair of bearing end surfaces to each of which is attached a hub of a kite link. Accordingly, the threaded carriage or ball nut is straddled by each kite link as it travels along the threaded ball screw driven by the motor. The other end of each of the twin kite links is attached to the upper end of the output shaft or ram of the blind spline broaching machine. Each kite link has two outboard hubs, equally spaced on each side of a line which passes through the center of the hub attached to the upper end of the ram as well as the hub attached to the ball nut or carriage. The location of the outboard hubs on either side of a centerline between the center of the end hubs is variable depending on the desired amplitude of the stroke as well as the forces needed in order to accomplish a specific broaching operation.

In order to prevent side loads from being applied to the carriage as well as the helical drive screw, including the output ram, a pair of guide tracks are placed alongside each of the outboard hubs of the kite links to trap the outboard hubs between two surfaces directly attached to the frame of the machine. The guide tracks provide a bearing surface for the outboard hubs such that side loads generated by the movement of the ball nut along the ball screw from a start of travel to an end of travel position are distributed into the machine structure, thereby avoiding any bending or deflecting of either the ram or the input helical drive shaft and associated carriage or ball nut. The opposing guide tracks support and contain the outboard hubs of the kite links, as the tool travels through the workpiece to distribute side loads into the machine structure such that the drive links apply only the force that is parallel to the straight-line motion of the output motion of the ram. Therefore, all of the parallel components of the generated drive force will be borne on the ends of the links to broach the spline on the workpiece while all side loading will be distributed through the guide tracks into the machine structure with a minimum deflection of the ball nut and screw drive shaft. Therefore, although the kite link, by attachment to the carriage, moves through significant angular displacement with respect to the linear movement of the output ram, the kite link and associated outboard hubs and guide ramps convert the rotary input motion to a linear output motion which moves the ram in a reciprocating linear direction without generating any side loads on the drive linkage itself.

By the use of this mechanical drive linkage combination, the blind spline broaching machine completes a cycle beginning with the carriage or ball screw traveling linearly along the helical ball nut from a beginning position where the ram is in a topmost position, to a mid travel position, where the ram is in a lowermost position and the tool has completed its cut through the workpiece and is stopped within a groove at the end of the spline in the workpiece, to an end of travel position where the ram has been retracted from the workpiece and reached a retracted end of travel position to restart a second cycle from the topmost position.

Several advantages of the present invention arise from the use of this mechanical drive linkage mechanism which is more reliable and generates a shorter cycle time than the hydraulic systems used in the prior art. Further, the environmental problems associated with the use of hydraulic fluids are completely eliminated since the drive is completely mechanical and does not generate hydraulic fluid leakage which is an environmental disadvantage. The use of the mechanical drive linkage has also resulted in a significant decrease in cycle time due to the inertial effect experienced with the mechanical drive. Further, the shut height repeatability of this mechanical drive linkage is significantly more accurate, in that the mechanical drive linkage provides a more positive stop position than attempting to stop on a column of hydraulic oil as is the case in prior art hydraulic drives. Because of the advantage of the inertia of the mechanical drive, as well as smooth constant motion of the ball nut along the helical screw as the drive goes through its cycle, the impact of the tool with the workpiece is smoother than experienced with a hydraulic drive thereby significantly increasing the tool life. Further, because of the inertial build up of the drive, once the mid-position of the ball screw travel is reached the drive immediately goes into a deceleration mode enabling the use of one half of the travel of the carriage for purposes of decelerating the drive.

Accordingly, it is an object of the present invention to provide a mechanical drive linkage apparatus which converts a rotary movement into a symmetrical reciprocating movement.

It is a further object of the invention to provide a mechanical drive apparatus which may be adapted to a blind spline broaching machine wherein the side loads associated with a rotary movement being converted to a symmetrically reciprocating movement are absorbed directly by the machine frame components and not allowed to have any effect on the drive linkage itself.

It is still a further object of the invention to provide a mechanical drive apparatus for a blind spline broaching machine which may be used in conjunction with a loading/unloading mechanism which inserts an unfinished workpiece into the machine and removes a finished workpiece therefrom during one cycle of the mechanical drive apparatus.

It is a still further object of the invention that the mechanical drive apparatus as illustrated in conjunction with the use of a blind spline broaching machine in the proposed embodiment be capable of broader applications and be used for many other types of machines.

It is a still further an object of the invention to provide a mechanical drive apparatus which is compact and consumes less energy than the prior hydraulic drive mechanism utilized in blind spline broaching machine operations.

It is yet another object of the invention that at least two mechanical drive apparatuses be used in conjunction with a loading/unloading station as disclosed in U.S. Pat. No. 5,315,750 in order to accomplish internal or external blind spline broaching of workpieces.

Other objects and advantages of this invention will be apparent in the following description and claims in which the principles of the invention are set forth together with details to enable persons skilled in the art to practice the invention all in connection with the best mode presently contemplated for the invention.

DETAILED DESCRIPTION OF THE PREFERRED EMBODIMENT

Figure 3:
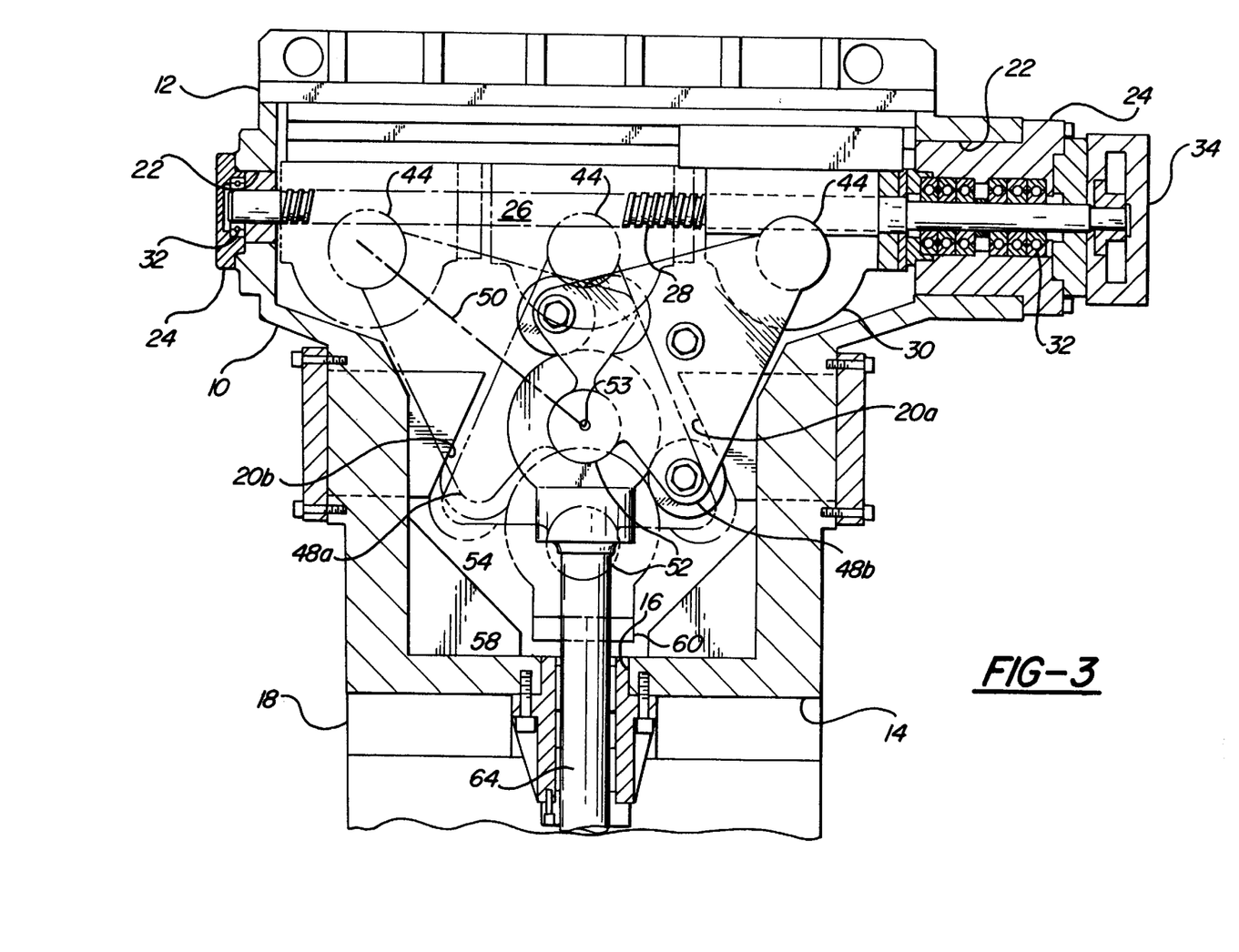
FIG. 3 is a partial cross-sectional fragmentary cut-away side view of the mechanical drive linkage of the invention.

With reference to FIG. 3, there is shown a mechanical drive linkage for a blind spline broaching machine having a cast housing 10 with an internal cavity having its upper end enclosed with a cover 12 and a lower end 14 disposed opposite the upper end with an opening 16 therein for a purpose to be described hereinafter. A bridge plate 18 is attached to the lower end of the housing to provide structural support as well as to accommodate the mounting of the housing in the frame of the blind spline broaching machine (not shown). The bottom of the bridge plate 18 directly faces the top of the indexing table 112 shown in FIG. 2.

To the internal side surfaces of the cavity within the housing are mounted two guide tracks 20a and 20b for a purpose to be described hereinafter. Near the top of the housing is located a bore 22 through each of the side plates. The bore 22 is axially aligned for the purpose of providing a mount for bearing blocks 24 which support a lead or ball screw 26 extending between the bearing blocks. The lead or ball screw 26 has a helical thread 28 thereon for the purpose of linearly translating a ball nut or carriage 30 therealong. The ball screw 26 is appropriately mounted with ball bearings 32 to the bearing blocks 24. A servo motor 34 is mounted to the bearing block 24 at one end of the ball screw 26 to provide the power to rotate the helical screw. The lead screw and ball nut combination is a well known mechanical element to provide linear travel of the ball nut between the beginning of travel position and an end of travel position and requires no further detailed description to a person ordinarily skilled in the art.

Figure 4:
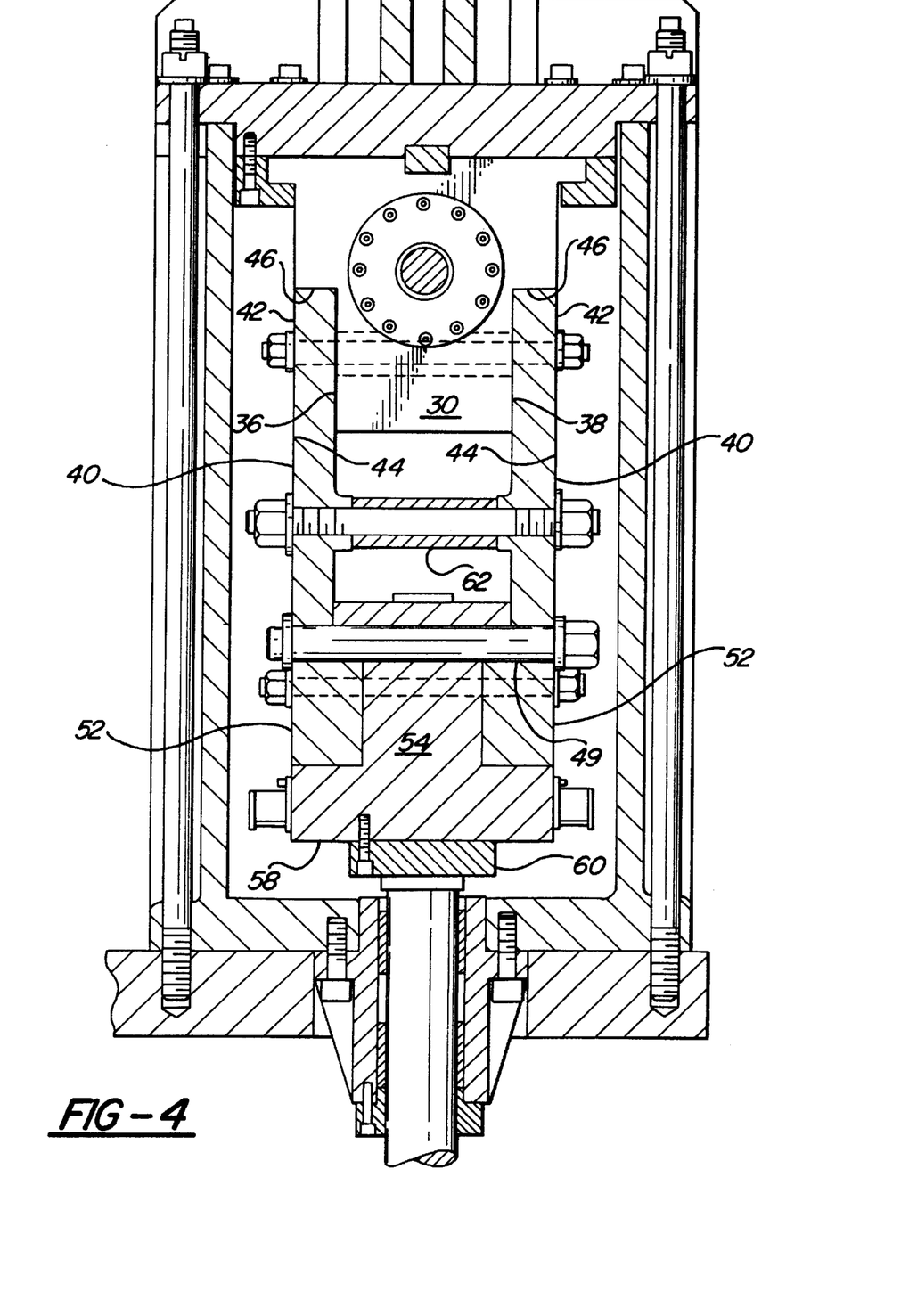
FIG. 4 is an end view, partly in cross section, of the mechanical drive linkage shown in FIG. 3.

As best shown in FIG. 4, the carriage 30 has a planar front surface 36 and planar rear surface 38 to each of which is attached an upper hub 44 of a pair of kite links 40. A protrusion 42 on the upper hub 44 of each of the kite links 40 is mounted within a counterbore 46 on each of the planar front and rear surfaces of the carriage. The carriage 30 is thereby sandwiched between the upper hubs 44 of the kite links 40. Each of the kite links 40 have two outboard hubs 48a and 48b symmetrically spaced about a centerline 50 which passes through the center of the upper hub and the center of a lower hubs 52. Each of the outboard hubs 48a, 48b (as shown in FIG. 4) are attached to each other with a sleeved spacer 49 in any convenient manner. In the disclosed embodiment the sleeved spacer 49 has an aperture for receiving a screw bolt to securely attach the opposing hubs 48a and 48a together. The lower hubs 52 are also secured together by the use of a screw bolt which also serves to secure a pivotable clevis link 54 between the oppositely facing hubs 52. The clevis link 54 is pivotably attached to the lower hubs 52 and extends in a downward direction terminating in a ram mounting flange or sleeve 58 which receives the upper end of a ram 64 with a ram mounting plate 60 therebetween, as clearly shown in FIG. 3.

Similarly, each of the outboard hubs 48a and 48b of each of the kite links 40 is attached to a spacer (not shown) to secure the pair of kite links to each other. Further, with reference to FIG. 4, a central spacer 62 is located between the adjoining kite links and a bolt and screw or any other convenient attaching method is used to secure both kite links in position with the upper hubs straddling the carriage as earlier described and the lower hubs 52 secured together with the pivotable clevis link 54 so that the kite links 40 can pivot about the axis 53 of the lower hubs 52.

One end of the ram 64 is slidingly mounted within the ram mounting plate 60 and extends in a downward direction through the aperture 16 of the cast housing 10 and bridge plate 18. Because of the exceptionally high forces generated by this mechanical drive, up to 80 ton, it is necessary to provide a safety feature in conjunction with the ram which is illustrated in FIG. 5.

Figure 5:
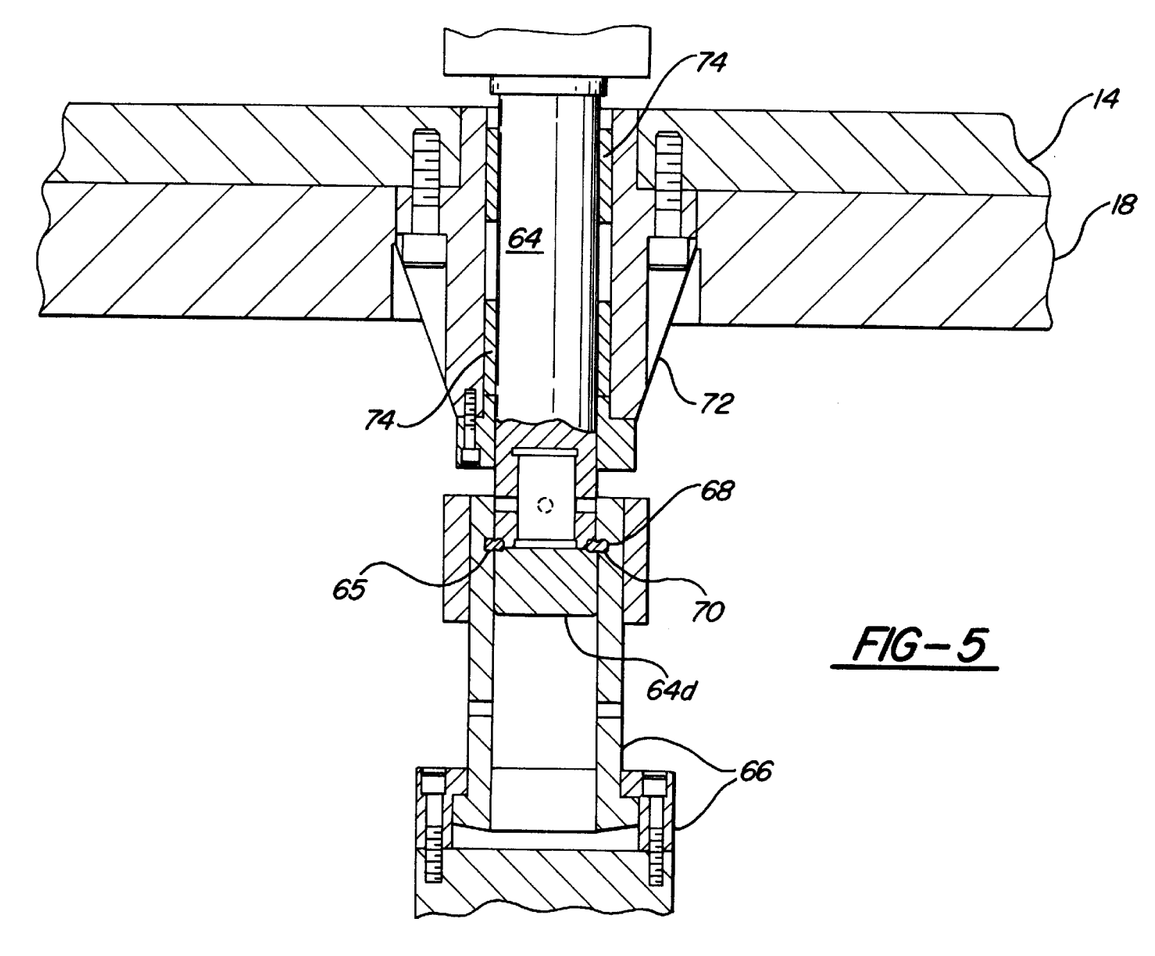
FIG. 5 is a side view, partly in cross section, of the safety feature built into the ram of the mechanical drive linkage of the invention.

FIG. 5 illustrates a safety feature which was necessitated due to the force generated and especially the inertia force generated during the cycling of the mechanical drive linkage system. In order to prevent the destruction of any components of the mechanical drive linkage if the ram encounters some form of an obstruction during its cycle a tool retainer 66 is mounted to the lower end 64d of the ram.. To allow the mechanical drive to complete its cycle should the ram movement somehow be obstructed during its downward motion, a thrust ring 68 is mounted partially in a groove 65 in the ram and partially in a groove 70 of the tool. A ram support housing 72 surrounds the ram and is mounted to the bridge plate 18 as well as the lower end 14 of the housing. Within the housing is packing material 74 which provides guidance and frictional support for the ram as it moves through its stroking motion. When an obstruction is encountered by the tool (not shown) which is attached to the tool retainer 66, the retainer immediately comes to a stop and the inertia force generated by the drive continues to move the ram in a downward direction resulting in the shearing of the thrust ring 68 allowing the ram 64 to continue its downward motion within the tool retainer 66 and complete its cycle while the tool retainer is stationary. An appropriate sensor (not shown) is utilized to communicate with the servo motor 34 of the machine to indicate that the tool retainer did not reach its lowermost position (due to the obstruction) and thereby stop the machine so that an operator can inspect the machine, remove the obstruction, install a new thrust ring and continue its intended function. It is to be understood that the retainer can be used to mount either the tool or the workpiece. A skilled artisan will understand that in a blind spline broaching machine the indexing table can be used to mount the tool within the chuck with the workpiece held by the retainer 66 or alternatively the retainer can be used to hold the tool while the chuck of the indexing table holds the workpiece.

In operation, the mechanical drive linkage mechanism provides a translation of rotary motion actuated by the servo motor 34 to move the ball screw 26 or carriage in a linear direction from a beginning of stroke position to an end of stroke position. At the beginning of stroke position, the ball screw is located as viewed in FIG. 3 in a right most position near the end of the ball screw closest to the servo motor 34. The kite link, through attachment of the upper hub 44 with the carriage and thereby to the ball screw, has only one of its outboard hubs 48b in contact with the guide track 20a. As the ball nut or carriage 30 begins to translate linearly along the ball screw 26 the kite links pivot about the upper 44 and lower outboard 48b hubs and rotate to bring the outboard hub 48a in contact with the guide track 20b which occurs just before the tool enters the workpiece. As the linear translation of the carriage continues, and as both outboards hubs 48a and 48b are in contact with the respective guide tracks 20b and 20a the tool enters the work to perform the broaching of the blind spline and continues its downward motion while the outboard hubs 48a and 48b are trapped between the guide tracks 20a and 20b until the complete cut is made through the work and the upper hub 44 reaches a mid-point position.

At the mid-point position the tool has gone completely through the workpiece and broached the spline and has come to a stop within a narrow groove provided in the part at a depth below the bottom of the spline profile being cut to allow the chip produced by the cutter to shear from the part. As the carriage 30 continues beyond the mid-point position, the outer hubs 48a and 48b of the kite links 40 still trapped between the guide tracks 20a and 20b begin to move with the outboard hub 48a moving downward along the guide track 20b and the outboard hub 48b moving upwards along the guide track 20a until the carriage reaches an end of travel or stroke position as viewed in FIG. 3, i.e, the leftmost position of the carriage 30. When the end of stroke position is reached, the tool is completely retracted from the workpiece and the indexing table is staged in order to bring a new workpiece into position for the next stroke. The motor 34 is then reversed to cause the carriage 30 or ball nut to travel back towards the beginning of stroke position while a second workpiece is broached according to the description set forth above.

The interaction of the guide tracks 20a and 20b with the outboard hubs 48a and 48b completely trapped within the guide tracks 20a and 20b during the work portion of the stroke, prevents the drive force from bending or deflecting the helical shaft so that all of the side loads generated by the pivoting of the kite link are directly absorbed through the frame structure by the guide tracks 20a and 20b and only the downward force vectors are applied to the ram 64 in order to move the ram 64 downward to perform the work. It is to be noted that by the use of the translating carriage 30 it is possible to attempt to obtain a constant velocity input of the drive mechanism through the cut in order to provide a cut, as efficiently as possible, with minimum wear and tear on the tool. Since once the work has been performed, the velocity of the ram quickly approaches zero, it is intended that for some applications the ram can be stopped at mid point, if necessary, with minimum effect on the components of the drive. The servo motor 34 can simply be restarted from the mid-point position in order to retract the tool from the workpiece with little effort since the work stroke has been completed. This arrangement would obviously be in a situation which is, as shown in FIG. 2, where two mechanical drives are mounted adjacent to each other to accommodate the indexing mechanism as described in the background of the invention. If, for whatever reason, the ram is obstructed during its cycle, the shear or thrust ring 68 will break and allow the tool retainer to stand still while the ram itself would continue to travel within the tool retainer 66, so that the cycle can be completed without any damage to the drive linkage system or housing. An appropriate sensor is used to stop the machine once the sensor has determined that the tool retainer did not reach its bottommost position. The obstruction would then have to be removed before the drive can be restarted to begin its next cycle.

While the invention has been described in terms of the preferred embodiment in conjunction with the use of a blind spline broaching machine, it will be appreciated, however, that the drive mechanism is capable of broader applications and could be used for many other types of machines. Accordingly, the scope of the invention is to be limited only by the following claims.

What is claimed:

1. A mechanical drive linkage comprising:

a housing base;

a helical ball screw member mounted within said housing base, said helical ball screw member having a central axis and an end portion extending in a direction away from said housing base;

a helical ball nut member mounted to said helical ball screw member for reciprocal movement along a linear path between first and second end positions;

means for driving said helical ball nut member between said first and second end positions, said drive means having a housing mounted to said housing base and an extended portion attached to said end portion of said helical ball screw member;

a ram mounted in said housing base about a central axis extending in a direction transverse to said central axis of said helical ball screw member, said ram having an upper end portion and an oppositely disposed lower end portion such that said ram reciprocates between a beginning of travel position to an end of travel position;

a clevis link having one end mounted to said upper end of said ram;

pivot means having one end attached to said helical ball nut member and an opposite end attached to said clevis link for pivotable movement whereby as said drive means drives said helical ball screw member to linearly translate said helical ball nut member therealong, said one end of said pivot means moves linearly with said helical ball nut member while said opposite end of said pivot means moves in a direction transverse to said central axis of said helical ball screw member from a first beginning of travel position to a second end of travel position;

means for guiding said pivot means, said guiding means attached at one end to said housing base and having at least a portion mounted contiguous said pivot means to guide said pivot means as said ram reciprocates from said beginning of travel position to said end of travel position; and means for pivotably attaching said one end of said pivot means to said helical ball nut member and said opposite end of said pivot means to said clevis link.

2. The mechanical drive linkage as claimed in claim 1 further comprising:

a retainer member mounted to said lower end portion of said ram;

frangible means for mounting said ram to said retainer member whereby when said retainer member comes to a stop other than said end of travel position of said ram, said frangible mounting means allows said ram to travel to said end of travel position to complete its cycle; and means for detecting the position of said retainer member between said beginning of travel position and said end of travel position.

3. The mechanical drive linkage as claimed in claim 1 wherein said pivot means further comprises:

an upper cylindrical hub member located at said one end of said pivot means, said upper cylindrical hub member having a central axis;

a lower cylindrical hub member located at said opposite end, said lower hub member having a central axis, a point on each said axes of said upper and lower cylindrical hub members defining a centerline between said upper and lower cylindrical hub members;

a first outboard hub member disposed on one side of said centerline between said upper and lower cylindrical hub members;

a second outboard hub oppositely disposed from said first outboard hub on the opposite side of said centerline between said upper and lower cylindrical hub members; and said first outboard hub and said second outboard hub engaging said guiding means to guide said ram between said beginning of travel and said end of travel positions as said driving means rotates said helical ball screw member to translate said helical ball nut thereon.

4. A method of mechanically driving a blind spline broaching machine, said method comprising the steps of:

placing a helical ball screw having a central axis within a housing;

attaching a helical ball nut to said helical ball screw;

placing a ram in said housing a predetermined distance from said helical ball screw, said ram having a central axis extending in a direction transverse from said central axis of said helical ball screw;

attaching a clevis link to the top of said ram;

placing a pivot link between said helical ball nut and said clevis link;

attaching an upper hub of said pivot link to said helical ball nut;

attaching a lower hub of said pivot link to said clevis link; and placing a pair of guide ramps on said housing directly opposite to each other and straddling a symmetrically disposed pair of outboard hubs on said pivot link;

whereby as said helical ball screw rotates and translates said helical ball nut thereon, said upper hub of said pivot link pivots and travels linearly with said helical ball nut while said lower hub of said pivot link translates linearly in a direction transverse to said central axis of said helical ball screw such as to reciprocate said ram between a beginning of travel position to an end of travel position.

5. In combination with a blind spline broaching machine of the type having a base, a multiple station loading/unloading rotary indexing table mounted to said base and a dual ram driven by at least one mechanical drive linkage, the improvement comprising:

a housing mounted to said base and extending above said multiple station loading/unloading indexing table;

a helical ball screw member mounted within said housing, said helical ball screw member having a central axis and an end portion extending in a direction away from said housing;

a helical ball nut member mounted to said helical ball screw member for reciprocal movement along a linear path between first and second end positions;

means for driving said helical ball nut member between said first and second end positions, said drive means having a housing mounted to said housing and an extended portion attached to said end portion of said helical ball screw member;

a ram mounted in said housing about a central axis extending in a direction transverse to said central axis of said helical ball screw member, said ram having an upper end portion and an oppositely disposed lower end portion such that said ram reciprocates between a beginning of travel position to an end of travel position;

a clevis link having one end mounted to said upper end of said ram;

pivot means having one end attached to said helical ball nut member and an opposite end attached to said clevis link for pivotable movement whereby as said drive means drives said helical ball screw member to linearly translate said helical ball nut member therealong, said one end of said pivot means moves linearly with said helical ball nut member while said opposite end of said pivot means moves in a direction transverse to said central axis of said helical ball screw member from a first beginning of travel position to a second end of travel position;

means for guiding said pivot means, said guiding means attached at one end to said housing and having at least a portion mounted contiguous said pivot means to guide said pivot means as said ram reciprocates from said beginning of travel position to said end of travel position; and means for pivotably attaching said one end of said pivot means to said helical ball nut member and said opposite end of said pivot means to said clevis link.

* * * * *